United States Patent
Norrgard et al.

(10) Patent No.: US 7,616,601 B2
(45) Date of Patent: Nov. 10, 2009

(54) NETWORK RESOURCE MANAGER IN A MOBILE TELECOMMUNICATION SYSTEM

(75) Inventors: Joakim Norrgard, Lulea (SE); Anders Larsson, Lulea (SE); Olov Schelen, Norrfjarden (SE)

(73) Assignee: Netsocket, Inc., Plano, TX (US)

( * ) Notice: Subject to any disclaimer, the term of this patent is extended or adjusted under 35 U.S.C. 154(b) by 573 days.

(21) Appl. No.: 10/250,702

(22) PCT Filed: Dec. 20, 2001

(86) PCT No.: PCT/SE01/02847

§ 371 (c)(1),
(2), (4) Date: Dec. 19, 2003

(87) PCT Pub. No.: WO02/056564

PCT Pub. Date: Jul. 18, 2002

(65) Prior Publication Data

US 2004/0082338 A1    Apr. 29, 2004

Related U.S. Application Data

(60) Provisional application No. 60/261,166, filed on Jan. 16, 2001.

(51) Int. Cl.
*H04W 4/00* (2009.01)

(52) U.S. Cl. .................. 370/329; 370/328; 370/349

(58) Field of Classification Search ............... None
See application file for complete search history.

(56) References Cited

U.S. PATENT DOCUMENTS

| 6,631,122 B1 * | 10/2003 | Arunachalam et al. ...... 370/332 |
| 6,668,175 B1 * | 12/2003 | Almgren et al. ............. 455/522 |
| 6,701,149 B1 * | 3/2004 | Sen et al. ..................... 455/436 |
| 6,798,757 B2 * | 9/2004 | Mizutani et al. ............. 370/329 |
| 7,006,472 B1 * | 2/2006 | Immonen et al. ............ 370/332 |

FOREIGN PATENT DOCUMENTS

| EP | 1 056 246 | 11/2000 |
| EP | 1 059 792 | 12/2000 |
| WO | WO 01/54357 | 7/2001 |
| WO | WO 01/59986 | 8/2001 |
| WO | WO 01/89234 | 11/2001 |
| WO | WO 03/021888 A1 | 3/2003 |

OTHER PUBLICATIONS

Schelén, O., Doctoral Thesis, "Quality of Service Agents in the Internet", Luleå Tekniska Universitet, 1998:26 ISSN: 1402-1544; pp. 39-42.

* cited by examiner

*Primary Examiner*—Michael J Moore, Jr.
(74) *Attorney, Agent, or Firm*—Slater & Matsil, L.L.P.

(57) ABSTRACT

The present invention relates to a method and arrangement for providing end-to-end Quality of Service within a mobile telecommunication system. The communication system comprises at least one network e.g. a Core Network (CN) and at least one Radio Access Network (RAN) for Internet Protocol (IP) based transmission, wherein a Network Resource Manager (NRM) comprising a resource map is monitoring and/or controlling resources within the IP network.

27 Claims, 6 Drawing Sheets

NETWORK RESOURCE MANAGER IN A MOBILE TELECOMMUNICATION SYSTEM

CROSS REFERENCE TO RELATED APPLICATIONS

This application is the 35 USC 371 national stage of international application PCT/SE01/02847 filed on Dec. 20, 2001, which designated the United States of America, and claims priority of provisional application 60/261,166 filed on Jan. 16, 2001.

FIELD OF THE INVENTION

The present invention relates to a method in a communication system and to a network resource manager in a communication system.

In particular, it relates to a Network Resource Manager (NRM) and a method thereof for providing an improved performance in a mobile telecommunication system comprising at least one network means e.g. a Core Network (CN) connected to at least one Radio Access Network (RAN), using Internet Protocol (IP) based transmission.

BACKGROUND OF THE INVENTION

FIG. 1 shows a circuit switched mobile telecommunication system 100 according to the prior art. The system 100 comprises a CN 104 that comprises at least one Mobile Switching Center (MSC) and a RAN 102. The RAN 102 comprises at least one controlling unit 106 that is connected to the MSC. The controlling unit 106 is a Base Station Controller (BSC) in a GSM system and a Radio Network Controller (RNC) in a UMTS system. Each controlling unit is further connected to at least one Base Station (BS) and each BS is respectively adapted to communicate over a radio interface 108 with at least one Mobile Terminal (MT). The MSC is also connected to a Public Switched Telephone Network (PSTN) via a Gateway MSC (not shown in the figure). In a circuit switched system as shown in FIG. 1, voice and data sessions are guaranteed network resources via signalling, i.e. the Mobile Terminal (MT) signals its network resource demands to the system. If resources are available, a dedicated communication circuit that guarantees resources for the session is set up through the network.

A current networking trend is to provide "IP (Internet Protocol) all the way" to wireline and wireless units. The objectives are to simplify infrastructure, to support a wide range of applications, and to support heterogeneous user demands on the communication service. This trend is applicable to wireless systems such as GSM (Global System for Mobile communication), GPRS (General Packet Radio Service), and UMTS (Universal Mobile Telecommunication System).

One step towards an all IP wireless system is to replace the traditional circuit switched technology by packet switched IP technology. By doing so, some of the network resource management mechanisms that are built into the system are no longer available and need to be replaced. The architectural components such as the MSC, Controller and the BS are still present but IP routers have replaced circuit switched network elements in order to provide IP based transmission. I.e., IP routers are introduced in network, e.g. within the CN and between the CN and the RAN and between and BS and a BSC in the RAN. In the wireless parts, the packet transfer over the radio interface (between a BS and a MT) is controlled by other protocols such as RLC, MAC and RRC that e.g. manage radio resources and provide reliable links.

In such a system, traffic circuits can be emulated by setting up IP tunnels between the logical components. The IP tunnels must provide a bearer service equivalent to that provided by the circuits in a circuit switched system.

The big challenge in this convergence lies in supporting multiple services with different Quality of Service (QoS) requirements that is providing e.g. an appropriate delay, jitter and packet loss guarantees for each service. To provide appropriate QoS, different types of resources (e.g. radio resources, network resources and power resources) have to be managed in the systems. Architectural components managing resources, e.g. in the Radio Access Network (RAN) and the Core Network (CN), of these systems are defined in different standards.

As stated in the previous section the trend is that future telecommunication systems will be all IP multi-service systems. FIG. 2, shows an example of a packet switched wireless system 200, e.g. a third generation (3G) UMTS system. The system comprises a CN with IP based transmission that comprises IP routers R and support nodes; a Serving GPRS Support Node (SGSN) that e.g. implements mobility functions and Gateway GPRS Support Node (GGSN) that implements interoperability with other systems, e.g. the Internet or PSTN. The system further comprises RANs that comprise a controlling unit 204, Base Stations BS and IP routers R. In the system 200, the SGSN, the GGSN, the controlling unit 204 e.g. an RNC and the BS (and other network elements) are interconnected by means of the IP routers R. This system is thus optimised for delivering IP packet switched services and its system architecture differs from the circuit switched architecture. Both the RAN and the CN are IP networks where logical functions (e.g. Radio Resource Management (RRM)) are distributed, e.g. in the RNC and in the SGSN.

The 3G wireless system needs to support multiple services (e.g. voice conversations, data transfers, streaming media, etc.) which have different transport QoS requirements. Sessions will often span over the RAN and the CN of the system and into other peering telecommunication systems (e.g. a PSTN).

Moreover, services in 3G systems usually utilize so called bearer services that have different QoS characteristics for transporting the service through the system. UMTS, defines e.g. four QoS classes (conversational, streaming, interactive, background) for the UMTS bearer service. A bearer service can also be layered and partitioned between system domains. FIG. 3 shows the UMTS Bearer Service as an example. It is based on two components, the Radio Access Bearer (RAB) service and the CN bearer service. The UMTS Bearer Service ranges between the MT to the CN, and the (RAB) service from the MT to the CN (and the other way around) and the CN bearer service ranges within the CN.

It should be noted that the bearer services make use of IP based networks to provide the transport. To provide the appropriate bearer service, network resources within the IP network have to differentiate between traffic flows, and have to be managed so that resources are available when needed. These requirements have to be met in all parts of the system to provide appropriate end-to-end QoS. There is a need of QoS management functions in the different system domains to implement the bearer service in each system domain. A UMTS system relies on a number of bearer service managers, e.g. a RAB service manager and a CN service manager, that establish, modify and maintain their respective bearer service. The bearer service managers are located in different nodes (e.g. RNC, SGSN, GGSN) depending on in which system domain they manage the bearer service. The radio resources are thus managed by one or more bearer service managers (e.g. a RAB service manager) that handles the radio resources, i.e. the radio resource manager may be a part of the RAB service manager.

In the sections above a UMTS system is used as reference for describing the need of network resource management functions in IP-based wireless systems. The description is, however, equally applicable for wireless systems based on other current and evolving standards e.g. cdma2000, GSM/GPRS as well as evolving releases of the UMTS standard. Other systems and releases may be partitioned into other system domains, use other terminology for describing the transport service and characterise the transport in other ways, but they will still use IP networks for transport of different services. This implies that the systems need network resource management functions for being able to provide transport services with certain QoS characteristics.

As described above, the present invention relates to systems using IP based transmission. There are some characteristics that are common for IP-based systems that relate to the nature of how IP networks work and how they are designed. These characteristics are discussed in the following.

The IP protocol is designed to be used in networks where different traffic flows share network resources equally. This means that the received QoS depends on the current load in the network. To provide QoS guarantees for specific traffic, QoS mechanisms are required. Mechanisms and methods applied for this purpose are described below.

Traffic in these systems will usually be forwarded according to routes set up by distributed and dynamic intra- and inter-domain routing protocols such as OSPF (Open shortest Path First) and BGP (Border Gateway Protocol). These routing protocols automatically detect network failures and set up new routes to avoid the failure.

The network topologies in IP-based systems are less hierarchical than those in circuit switched systems. In 3G systems that are optimised for IP services the topology will be distributed, as can be understood from FIG. 2.

The packet switched nature of IP-based networks makes them very well suited for traffic aggregation. This will be used especially in RANs where link deployment can be very expensive. Redundant links will be used where network reliability is critical or to add resources between hot spot sites. Redundant links 206 can be seen in FIG. 2.

There are typically two known ways to provide QoS guarantees for bearer services in the RAN and the CN that use IP networks for transport; either to use QoS mechanisms such as Differentiated Service (DiffServ) or to over-dimension the network.

The (DiffServ) architecture is one QoS framework that can be applied to provide mechanisms for setting up traffic classes in the network to enable differentiation of network resources among services. At system set up, the different traffic classes are dimensioned to ensure that each class has sufficient resources. Dimensioning is based on service characteristics and assumed usage statistics.

For systems that provide one or a few services, over-dimensioning of the network is usually used to ensure sufficient resources. Service monitoring often complements over-dimensioning to discover where network resources are lacking and to trigger re-dimensioning of the network. For both the Diffserv capable and the "single service" network case described, dimensioning and re-dimensioning are done manually and there is no real-time control of the actual resource usage.

A solution based on dimensioning will work as long as the dimensioning assumptions hold. However, if the assumptions break, e.g. if the usage behaviour changes or a network link fails, some network links can get over-utilised causing degraded quality for some active sessions. FIG. 4 depicts a RAN comprising an RNC connected via IP routers to a number of BS and a number of MT. FIG. 4A shows a normal operation while FIG. 4B shows a scenario during a link failure 402 that results in insufficient resources on another link 404. It is possible to prevent this situation by over-dimensioning resources so that minor dimensioning mistakes can be handled. This will, on the other hand, cause the network to be under-utilised most of the time. The problem with the dimensioning method is that it is impossible to foresee all future events at the time of dimensioning and still achieve reasonable network utilisation. There is a need for a mechanism that keep track of how resources are used on each link in the network and that can reject setup of new bearer services over links where there are no resources left to fulfil QoS requirements. The same reasoning holds for the Diffserv case where network resources are provisioned to different service classes based on assumption on traffic loads and characteristics. There is a need for a mechanism that manages and controls the resources in each traffic class.

The problems described above can be extended to the scenario when a Mobile Terminal (MT) in a wireless system moves and causes handover between base stations. As the terminal moves, the need for resources in different parts of the network changes. It is impossible to predict how the terminal will move and thereby where network resources will be needed. If there is no entity in the system that controls and sets up resources, network links can get over-utilised at handover.

FIG. 5 shows a RAN comprising a RNC connected to a number of BS via IP routers R and MT. "ok" means that a connection has sufficient resources and "nok" means that a connection has insufficient resource. "1" means a first scenario and "2" means a subsequent second scenario. FIG. 5 illustrates another problem that occurs when sessions are denied to start even if resources are available in the system. Consider a situation when a terminal tries to start a session. The session can be denied due to lack of network resources as in FIG. 5a, lack of radio resources as in FIG. 5b, or lack of both radio and network resources as in FIG. 5c. In some cases it would be possible to accept the session if the terminal changed its point of connection from the currently serving base station to another one.

These problems, implies that there is a need for a resource management mechanism that have full knowledge of resource usage/allocation and network topology in the IP network.

An additional requirement on the bearer service delivered by a wireless system is that end-to-end QoS can be provided through all parts of the network. It is hard, if not impossible, to dimension all network parts in a system to meet all possible QoS requirements while not causing the network to be under-utilised most of the time. The difficulty to provide end-to-end QoS by dimensioning grows as the network and system grows.

In EP 1 059 792, a radio resource management for the radio link in a wireless IP system is showed and it describes a method and system that maps IP QoS parameters or requests to radio resource requests. It also addresses procedures for applying the mapping and managing the radio resources.

EP 1 059 792 does not address resource management issues for an IP network of a wireless system.

Thus, an object of the present invention is to achieve automatic network resource management for providing appropriate end-to-end QoS for sensitive services throughout a wireless and IP transmission based communication network.

Another object of the present invention is to enable efficient monitoring of how network resources are used by bearer services/calls on a per link basis and over time without the need to make measurements in routers.

SUMMARY OF THE INVENTION

The above-described objects are achieved by introducing at least one Network Resource Managers (NRM) into a cellular telecommunication system e.g., within a RAN and/or within a network means e.g. a CN in accordance with the present invention. The NRM monitors and/or manages and/or reserves resources within the network with IP based transmission within the cellular telecommunication system and a bearer service manager, such as a RAB service manager, manages radio resources in the wireless part of the cellular telecommunication network. How the radio resource management function/entity internally manages the resources within the wireless part, is however beyond the scope of this invention. It is hence possible to obtain an end-to-end QoS throughout the cellular telecommunication system.

An advantage with the present invention is that it solves problems related to providing reliable end-to-end QoS in IP-based wireless systems. It improves utilisation of the system and ensures QoS.

Another advantage with the present invention is that resources can be committed on a per-call basis through the RAN without signalling along a bearer path through the RAN. Admission control on a per-call basis avoids fragmentation of resources, which occurs if resources are reserved for aggregated trunks. Fragmentation of resources decreases the total utilisation in the RAN.

A further advantage with the present invention is that aggregated trunks also can be provided in the RAN. In comparison to signalled solutions for providing trunks, a distinct advantage with NRM is that trunk resources can be pre-allocated depending on time (e.g., time of day, day of week) to cater for recurring variations.

A further advantage with the present invention is that multiple services (e.g., video, VPN (Virtual Private Network)) can be supported with maximum utilisation. Policies for precedence between services of different kind can be enforced at a per session level.

An advantage with the monitoring according to the present invention is that it provides feedback to the planning and provisioning process of the network operator.

A further advantage with monitoring according to the present invention is that it enables monitoring of how bearer service uses network resources on a per-link and over time basis. This characteristic allows usage of the present invention as both an active network resource manager and/or passive monitoring component.

BRIEF DESCRIPTION OF THE APPENDED DRAWINGS

DETAILED DESCRIPTION OF PREFERRED EMBODIMENTS

Figure 1:
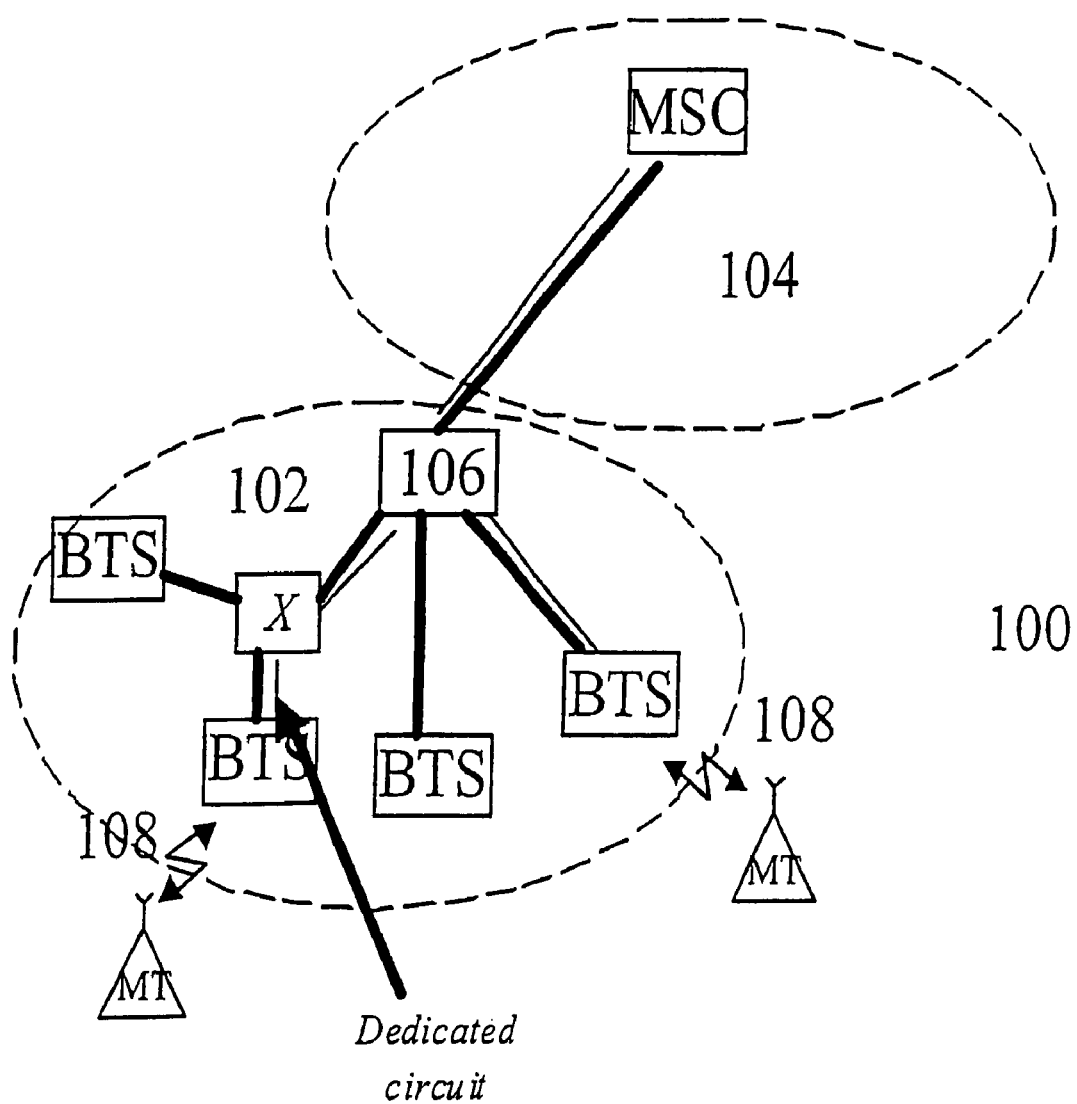
FIG. 1 illustrates a circuit switched wireless system
Figure 2:
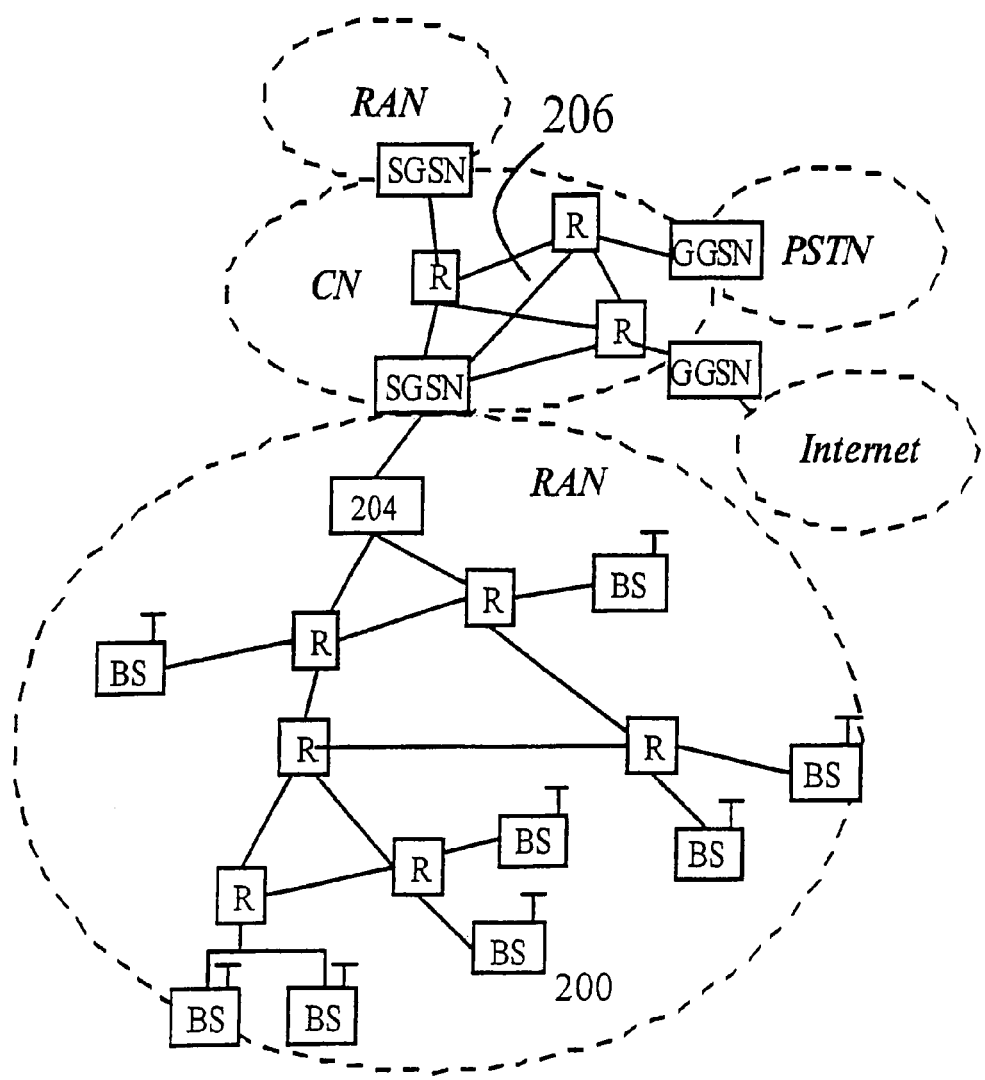
FIG. 2 illustrates an IP-based packet switched wireless system.
Figure 3:
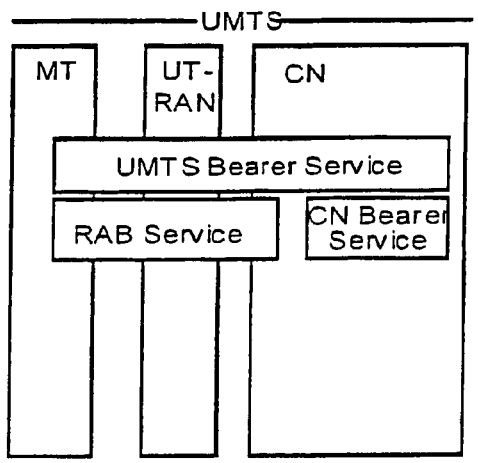
FIG. 3 illustrates bearer services in UMTS.
Figure 6:
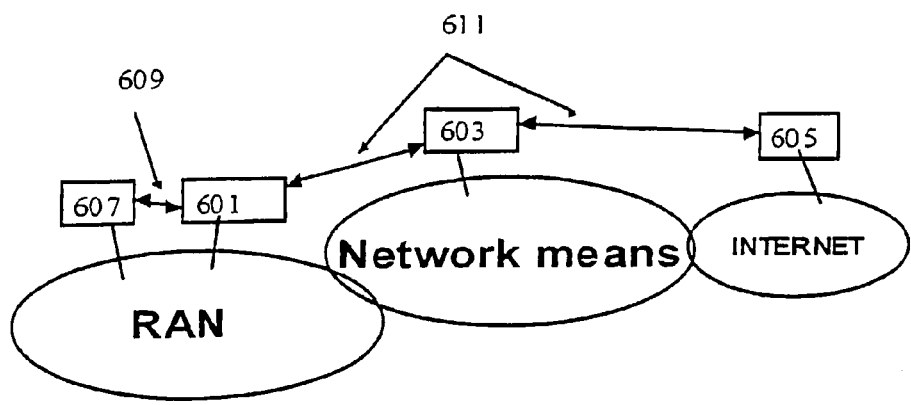
FIG. 6 shows Network Resource Manager (NRM) in a wireless system, according to the present invention.
Figure 4:
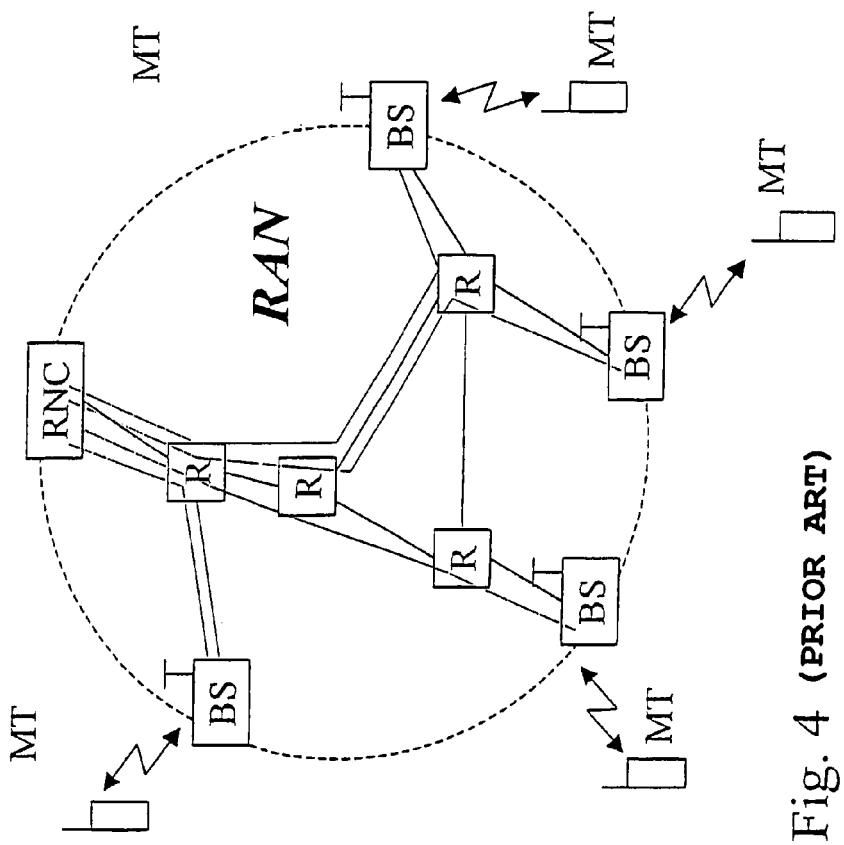
FIG. 4 shows a link failure in a RAN causing degraded quality for active sessions.
Figure 4:
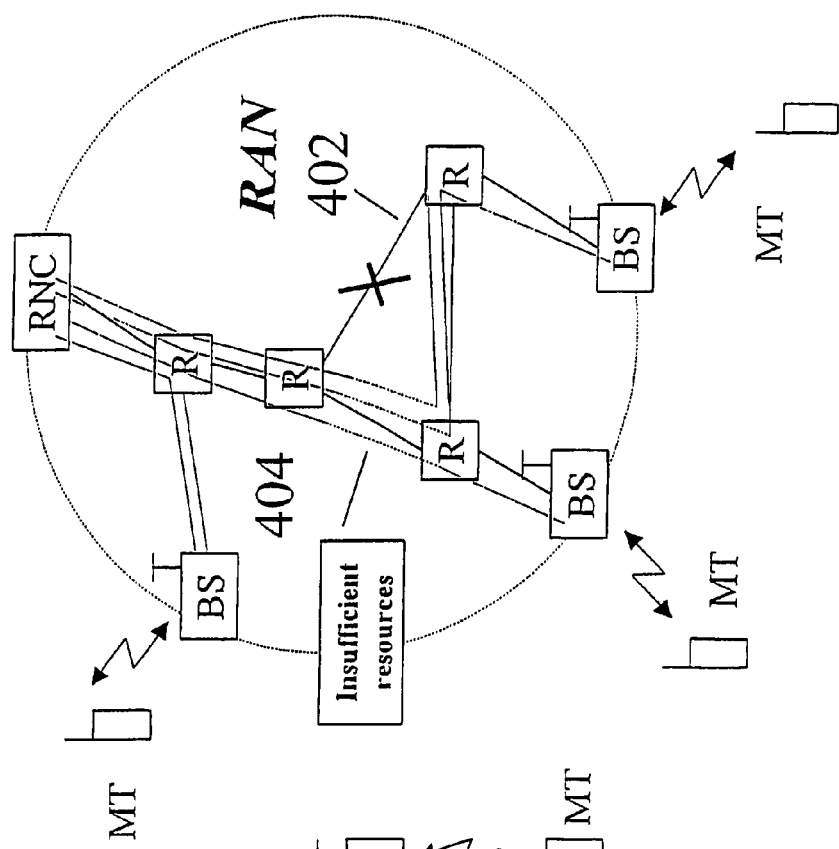
Figure 5:
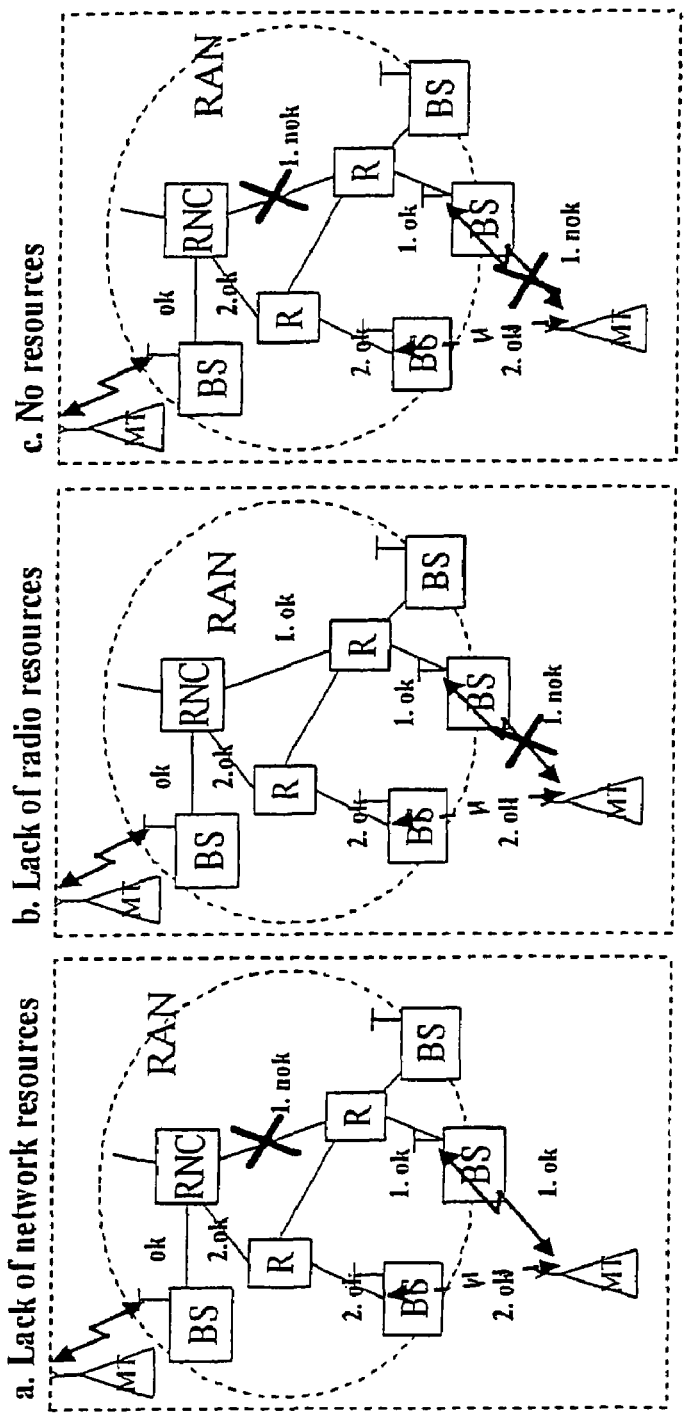
FIG. 5 shows examples of intelligent handover-scenarios.

Preferred embodiments of the present invention will now be described with references in particular to FIGS. 6 and 7. According to the present invention the Network Resource Manager (NRM) provides the following functionality:

dynamic awareness of network topology and network characteristics, path-sensitive call admission control, that is parameter and/or measurement based, scheduling of resources over time, capability to handle resource requests for immediate and future use, resource signalling between resource manager entities, coupling of the described NRM entity with radio resource management function/entity that manages the radio resources within the RAN.

The NRM can be implemented in software or hardware and it can run as a standalone node or run on the same node as other functionality such as Radio Resource (RR) management functionality (e.g. the RNC). In FIG. 6, the NRM 601 is coupled 609 to a bearer service manager 607 that is responsible for radio resource management. Another NRM 603 is located in the network means e.g. a CN and is responsible for the network resources within the network means e.g. a CN, and yet another NRM 605 is located within the Internet. The network means comprise the CN and future networks, e.g. an Internet, with corresponding functionality. More than one NRM may naturally be located in each respective node. Moreover, each NRM 603 may also be adapted to perform resource signalling 611 between another NRM 605. The NRM can also be integrated into other functionality (e.g. RR) to perform its described functions. The NRM may thus be distributed to run on multiple nodes (e.g. the RAN, the CN and the Internet) and/or distributed geographically over a network.

The NRM gains its dynamic topology awareness by retrieving routing information concerning the IP network, i.e. the topology of the IP network. In the case wherein the IP network is routed using a link-state routing protocol, the NRM participates in the routing and acts as a router, i.e. the NRM peers (i.e. exchange information) with other routers, without advertising any routes of its own, to retrieve routing information of the IP network. The basic principle on which link-state routing protocols are built ensures that all routers have the complete topology map. When participating in the routing protocol, the NRM receives the routing information as fast as any other router in the routing domain and can therefore detect changes in the topology instantly.

In the case when the IP network is routed using a distance vector protocol, or static routing, the method of peering cannot be used. In this case, the routing information is retrieved by measurements such as trace route and/or the use of Simple Network Management Protocol (SNMP) auto discovery. SNMP is a set of protocols for managing complex networks. It is also possible to configure an NRM with a network topology statically. When the NRM has retrieved the routing information, it uses a network management protocol, such as SNMP, to collect information on the routers and their interfaces (e.g. the interface type and speeds). The information is used by the NRM to complement the gained routing topology information and make sure that it has an accurate view of the routing topology.

The NRM combines the routing information and resource information it receives from call set-up requests to create a resource map (call setup request is described further below). The resource map contains information on how much resources (e.g. bandwidth) that are available and reserved over time on a per link basis. The NRM uses the resource map to decide whether there are resources available or not (i.e. it performs a call admission control), for a call setup request from an entity/function. The call admission control is path-sensitive, i.e. the NRM checks that resources are available along the path that will be used by the traffic concerned by a resource request. The call admission control can be based on resource information provided in previously made and present resource requests (e.g. parameter based call admission control) or it can be based on current network load measurements, historical load data and future load predictions (e.g. measurement based call admission control). Measurements can be either collected from the network by the NRM or provided by network elements (routers, switches, etc.) to the NRM. The call admission control can also be based on a combination of parameters and measurements.

By introducing a start and a stop time as a parameter in the resource request, resources can be scheduled over time. This allows the NRM to handle resource requests for both immediate and future use. A call setup request refers to a request made to an NRM from an entity/function that would like to reserve network resources. The requesting entity/function might use the network resources for providing appropriate service to a bearer service. Resource requests contain at least information about the end-points between which the resources are needed and the required amount of resources needed. The interaction between the NRM and the requesting entity/function can be implemented in a number of ways, e.g. via a communication protocol, inter process communication, functional calls between integrated software modules, etc. depending on how the NRM is running in the system.

The resource requesting entity/function in an IP-based wireless system is usually a bearer service manager or an equivalent entity/function that is responsible for controlling a bearer service spanning over an IP network. The bearer service manager may request network resources for a bearer service within a RAN, a CN or both.

An NRM controls network resources in a limited part of a network, in a network domain. These domains may be small (e.g. a few routers) or very large (e.g. tens of thousands of routers). Typically, an NRM controls a routing domain, i.e. an area of a network routed by one intra-domain routing protocol. In order to provide network resource management in large systems/networks where many NRMs are needed, NRMs can interact, i.e. signal resource request to each other. An NRM that makes a resource request to another NRM does this the same way as a non NRM makes request to an NRM. However, in some scenarios the NRMs are not required to be able to signal to each other, e.g. when there is no need for inter-domain communication and one domain is controlled by one NRM. The NRM is further described in "Schelen, O. Quality of Service Agents in the Internet, Doctoral Thesis, Department of Computer Science and Electrical Engineering, Division of Computer Communication, Luleå University of Technology, Luleå 1998" and in the Swedish Patent Application 0102929-7 filed Sep. 4, 2001.

Domains controlled by an NRM may or may not match system domains, e.g. a RAN or a CN. Thus, one or several NRMs may control one RAN and one or several NRMs may control one CN or an NRM may e.g. control one part of the RAN and one part of the CN in a network. There may also be system domains where other mechanisms than NRMs are used to control network resources. This means that there may be one or many entities/functions signalling resource requests to one NRM or one entity/function signalling requests to many NRMs.

The above described preferred embodiment of the present invention is exemplified in the following:

1. An event, e.g. an MT that initiates a call to a phone in a Public Switched Telephone Network (PSTN), triggers a request to one or multiple bearer service manager functions/entities to setup a bearer service within the wireless system. The bearer service manager can be located in different nodes (e.g. RNC, SGSN, GGSN, etc.) depending on the system domain (e.g. RAN part, CN part) it controls. The bearer service manager that controls the radio resources, the radio resource manager may be located in the RNC.

2. The bearer service manager sends a resource request to an NRM to guarantee that there are sufficient network resources in its system domain.

3. The NRM evaluates if resources are available in the network domain it controls. If the bearer service is spanning over domains controlled by other NRMs the first NRM communicate with these to find out if network resources are available in those domains. If network resources are available the resources are allocated for the bearer service.

4. The NRM replies the result of the resource request to the bearer service manager.

5. The radio resource manager, e.g. a part of the RAB service manager has made sure that there are radio resources available in its system domain.

6. If enough radio and network resources are available resources are reserved from the MT to PSTN.

It is obvious for a man skilled in the art that it is possible to perform these steps in another order, or add or delete some steps and still obtain the same result.

As a summary, when a service is about to start and resources are requested the NRM uses hence its knowledge of the network topology and resource usage at each link in the network domain it controls to calculate if there are resources available to accept the resource request. A bearer service manager entity/function for example located in an RNC or SGSN, or equivalent communicating thus its resource needs to an NRM that ensures that network resources do not get over-utilised on any links and can therefore provide appropriate QoS for a bearer service. NRMs in different network domains are, if required, also receiving the resource request to manage services spanning over multiple NRM controlled network domains. If acceptance of the request causes at least one link to be over-utilised the request is denied. Resources will thereby never be over-utilised on any network link.

The NRM monitors the network topology and discovers instantly (i.e. as fast as the routing protocol adapts to link failure, or as fast probing can discover a link failure) topology changes, e.g. due to link failures. If this happens, the NRM has the knowledge to calculate the resources needed to support active sessions. If it is not possible to support all active sessions in the new topology, the NRM can inform the system which sessions that should be pre-empted to prevent over-utilisation of resources. As a result of path-sensitive admission control and network awareness, over-dimensioning is not needed to prevent the effects of link failures or dimensioning mistakes.

The NRM can use its capabilities to pre-allocate network resources to prevent over-utilisation of resources at handover from one radio base station to another. This is obtained by setting a threshold for admitting new calls that is lower than the maximum available resources. Essentially resources for bearer services are pre-allocated in the IP network for being available in case of handover. It ensures that handover is given precedence to new calls at high load. The amount of resources set aside for handover defines a trade-off between the risk of dropping calls at handover and the risk of rejecting new calls. Management of handover is similar to how normal NRM call admission is handled; topology awareness in NRM enables discovery of which links that will be used at handover, path-sensitive admission control can decide if there are resources available on potential links. Allocation of resources ahead of finalising handover can be used to ensure availability of resources. The exact algorithm to use for choosing potential links and pre-allocating network resources is not within the scope of the present invention. It should be noted that the features of the NRM enables solving the handover problem with respect to the IP network.

If bearer service entities that manage the radio resources and network resources (e.g. the RAB manager and NRMs) are tightly coupled, as described below, they will have complete information about how radio and IP network resources are used and where resources are available in the system. This makes it possible to make joint optimisation of radio and IP network resources and direct a handover to where resources are available for a session which otherwise would have been denied.

Figure 7:
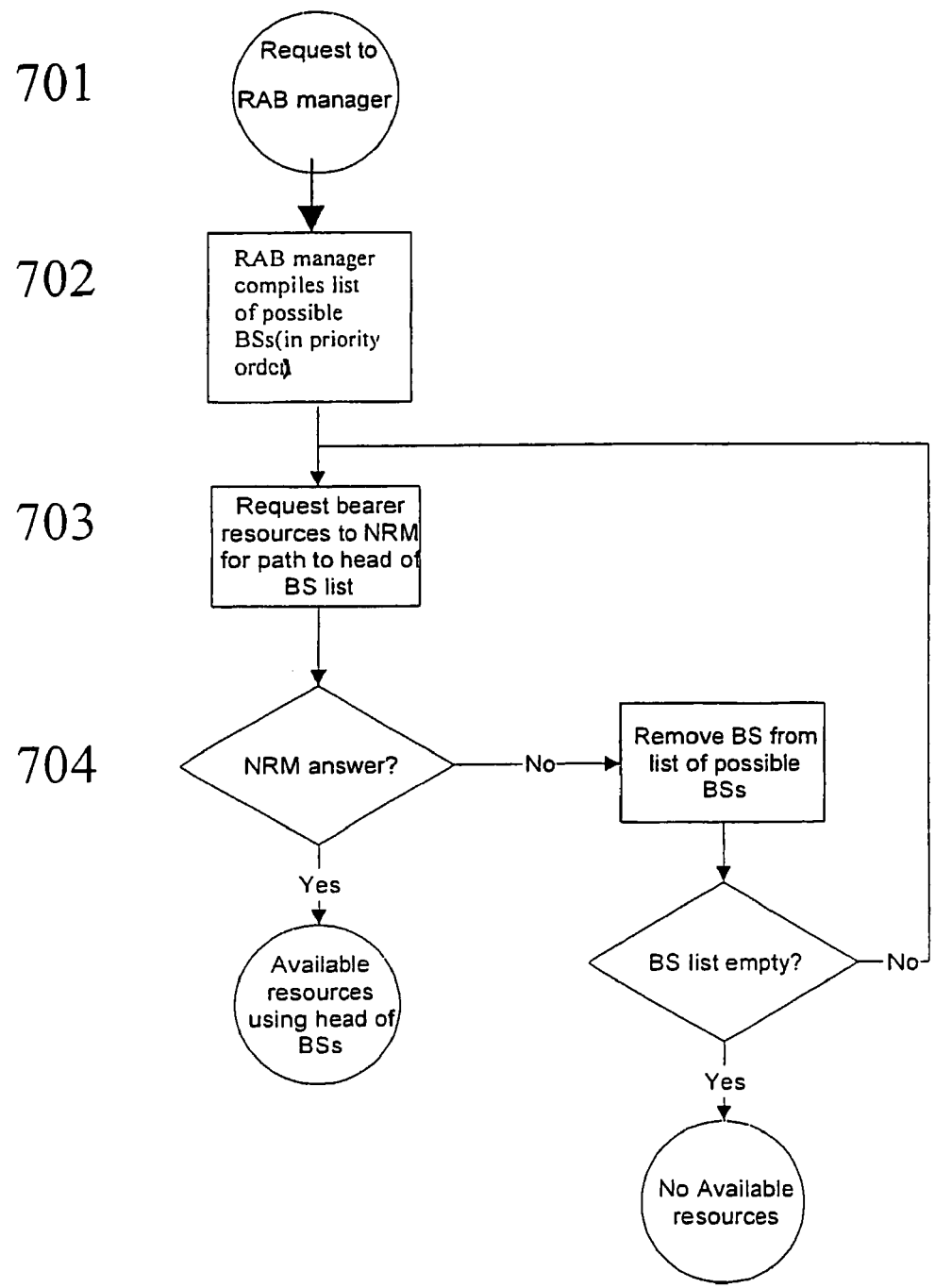
FIG. 7 shows a flowchart of a method for finding a BS with enough network and radio resources, according to the present invention.

FIG. 7 describes an example of iterations for finding a radio base station (BS) that can provide both radio and network resources. (A RAB manager is used in this example, but it could naturally be another manager entity/function within the network that handles radio resources.)

701. Request to RAB manager.
702. RAB manager compiles a list of possible BSs in priority order.
703. A request for bearer resources (i.e. radio resources) to the BS on top of the list (with highest priority), for a path, is transmitted to NRM. NRM investigates whether it can fulfil the resource request.
704. Yes: If the answer is yes, available resources are allocated to the BS with highest priority.
   No: If the answer is no, the BS with the highest priority is removed from the list. If the list then is empty, no resources are available and the service cannot be maintained or started. If there are remaining BSs in the list, go back to step 3.

This logical function may be implemented within a Radio Access Bearer (RAB) manager entity/function for example located in a RNC or equivalent that has knowledge of the radio resource situation in the network. The interaction/coupling can be implemented in a number of ways, e.g. via a communication protocol, inter process communication, functional calls between integrated software modules, etc.

The method may be implemented by means of a computer program product comprising the software code means for performing the steps of the method. The computer program product is run on processing means in a server and/or a router in an IP network, and/or a Radio Network controller (RNC) and/or a Serving GPRS Support Node (SGSN), and/or Gateway GPRS Support Node (GGSN) within a telecommunication system. The computer program is loaded directly or from a computer usable medium, such as a floppy disc, a CD, the Internet etc. However, the method may also be implemented by means of hardware.

Thus, end-to-end QoS is obtained in a wireless telecommunication system according to the present invention by letting NRMs control separate parts of the IP network, e.g. a first NRM controls resources within a RAN, and a second NRM controls resources within a CN. Several NRMs may control the IP network resources within a RAN or a CN or a single NRM may control all IP network resources in a RAN and a CN. The NRMs and the bearer service manager, that controls the radio resources within the wireless part, communicate hence their resource needs between each other through the system in order to obtain end-to-end QoS.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for providing end-to-end Quality of Service (QoS) within a mobile telecommunication system comprising a Core Network (CN) connected to at least one Radio Access Network (RAN) using Internet Protocol (IP) based transmission, the method comprising the steps of:
   handling radio resources within the RAN by using a radio resource manager;
   controlling IP network resources by using a resource map in a Network Resource Manager (NRM) in order to provide said end-to-end QoS, the step of controlling the IP network resources including the steps of the NRM performing path-sensitive call admission control by using the resource map in the NRM, the NRM checking that resources are available along a path, and the NRM pre-allocating resources in an IP network;
   scheduling resources over time by introducing a start and a stop time as a parameter in a resource request handled by the NRM;
   communicating resource information between the NRM and the radio resource manager; and
   reserving the IP network resources along the path by the NRM to fulfill the end-to-end QoS.

2. Method according to claim 1, wherein the NRM is used within the RAN and the CN.

3. Method according to claim 1, wherein the NRM is used within the RAN.

4. Method according to claim 1, wherein the NRM is used within the CN.

5. Method according to claim 1, the method comprising the further step of signalling resource information between the NRM and at least a second NRM used within at least a second network domain.

6. Method according to claim 1, the method comprising the further step of monitoring topology changes by using the NRM, retrieving routing information concerning the IP network.

7. Method according to claim 6, wherein the topology is monitored in order to be able to reallocate the IP network resources.

8. Method according to claim 1, wherein the path-sensitive call admission control is parameter based.

9. Method according to claim 1, wherein the path-sensitive call admission control is measurement based.

10. A Network Resource Manager (NRM) within a mobile telecommunication system that includes a Core Network (CN) connected to at least one Radio Access Network (RAN) using Internet Protocol (IP) based transmission and a radio resource manager that controls radio resources within the RAN, the NRM comprising a resource map and means for controlling IP network resources within an IP network using the resource map in order to provide end-to-end Quality of Service (QoS), said means for controlling comprising means for the NRM performing path-sensitive call admission control by using the resource map in the NRM, for the NRM checking that resources are available along a path, and for the NRM pre-allocating resources in the IP network part of the telecommunication system, means for scheduling resources over time by introducing a start and a stop time as a parameter in a resource request, means for communicating resource information between the NRM and the radio resource manager, and means for reserving the IP network resources along the path by the NRM to fulfill the end-to-end QoS.

11. NRM according to claim 10, further comprising means for being used within the RAN and the CN.

12. NRM according to claim 10, further comprising means for using the IP network resources within the RAN.

13. NRM according to claim 10, further comprising means for being used within the CN.

14. NRM according to claim 10, further comprising means for communicating with at least a second NRM used within at least a second IP network domain.

15. NRM according to claim 10, further comprising means for monitoring topology changes by retrieving routing information concerning the IP network.

16. NRM according to claim 15, wherein the topology is monitored in order to be able to reallocate access resources.

17. NRM according to claim 10, wherein the path-sensitive call admission control is parameter based.

18. NRM according to claim 10, wherein the path-sensitive call admission control is measurement based.

19. A Network Resource Manager (NRM) within a mobile telecommunication system that includes a Core Network (CN) connected to at least one Radio Access Network (RAN) using Internet Protocol (IP) based transmission and a radio resource manager that controls radio resources within the RAN, the NRM comprising:

a resource map;

means for controlling IP network resources within an IP network using the resource map in order to provide feedback to a network operator, said means for controlling comprising means for the NRM performing path-sensitive call admission control by using the resource map in the NRM, for the NRM checking that resources are available along a path, and for the NRM pre-allocating resources in the IP network part of the mobile telecommunication system;

means for scheduling resources over time by introducing a start and a stop time as a parameter in a resource request;

means for communicating resource information between the NRM and the radio resource manager;

means for reserving the IP network resources along the path by the NRM; and means for providing the feedback to the network operator.

20. NRM according to claim 19, further comprising means for being used within the RAN and the CN.

21. NRM according to claim 19, further comprising means for using the IP network resources within the RAN.

22. NRM according to claim 19, further comprising means for use within the CN.

23. NRM according to claim 19, further comprising means for communicating with at least a second NRM used within at least a second IP network domain.

24. NRM according to claim 19, further comprising means for monitoring topology changes by retrieving routing information concerning the IP network.

25. NRM according to claim 24, wherein the topology is monitored in order to be able to reallocate access resources.

26. NRM according to claim 19, wherein the path-sensitive call admission control is parameter based.

27. NRM according to claim 19, wherein the path-sensitive call admission control is measurement based.

* * * * *